(12) United States Patent
Sandbach et al.

(10) Patent No.: US 7,348,506 B2
(45) Date of Patent: Mar. 25, 2008

(54) LINEAR PRESSURE SENSOR

(75) Inventors: David Lee Sandbach, London (GB); Stuart Mark Walkington, Hertfordshire (GB)

(73) Assignee: Eleksen Limited, Hertfordshire (GB)

( * ) Notice: Subject to any disclaimer, the term of this patent is extended or adjusted under 35 U.S.C. 154(b) by 0 days.

(21) Appl. No.: 11/487,783

(22) Filed: Jul. 17, 2006

(65) Prior Publication Data

US 2006/0261985 A1 Nov. 23, 2006

Related U.S. Application Data

(62) Division of application No. 10/566,089, filed on Jan. 27, 2006.

(51) Int. Cl.
*H01H 34/00* (2006.01)
(52) U.S. Cl. .................... 200/52 R; 200/17 R
(58) Field of Classification Search ........... 200/52 R, 200/17 R, 600, 511, 512; 341/34, 22; 338/47; 514/27, 283, 2
See application file for complete search history.

(56) References Cited

U.S. PATENT DOCUMENTS 3,586,798 A * 6/1971 Holmes ................. 200/52 R 7,145,432 B2 * 12/2006 Lussey et al. ............. 338/47
2003/0119391 A1 6/2003 Swallow et al.
2006/0219542 A1* 10/2006 Savir ...................... 200/314

FOREIGN PATENT DOCUMENTS

| EP | 0653810 | 5/1995 |
|---|---|---|
| EP | 0913844 | 5/1999 |
| EP | 1052485 | 11/2000 |
| WO | WO-00/72239 A | 11/2000 |

\* cited by examiner

*Primary Examiner*—Elvin Enad
*Assistant Examiner*—Lisa Klaus
(74) *Attorney, Agent, or Firm*—Harness, Dickey & Pierce, P.L.C.

(57) ABSTRACT

A linear sensor (101, 201) comprising electrically conductive textile fibers (103, 105, 205, 207) and electrically insulating textile fibers (106, 208). The sensor comprises at least two conductive elements (102, 104, 204, 206) having electricall conductive textile fibers (103,105, 205, 207). The sensor also has electrically insulating textile fibers (106, 208) spaced to sepa the two electrically conductive elements when no pressure is applied to said sensor, and to allow electrical conduction between the two conductive elements under the application of pressure.

6 Claims, 2 Drawing Sheets

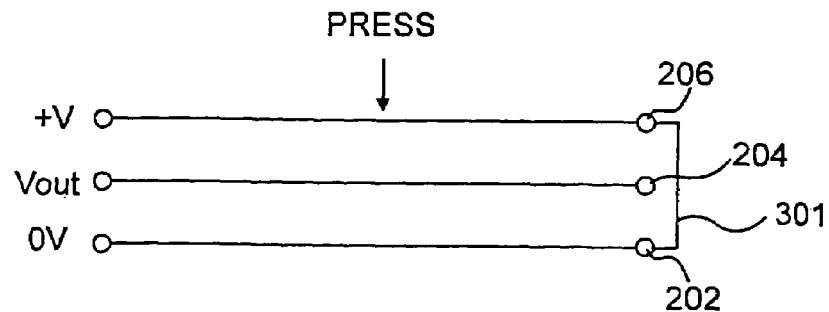
Figure 3
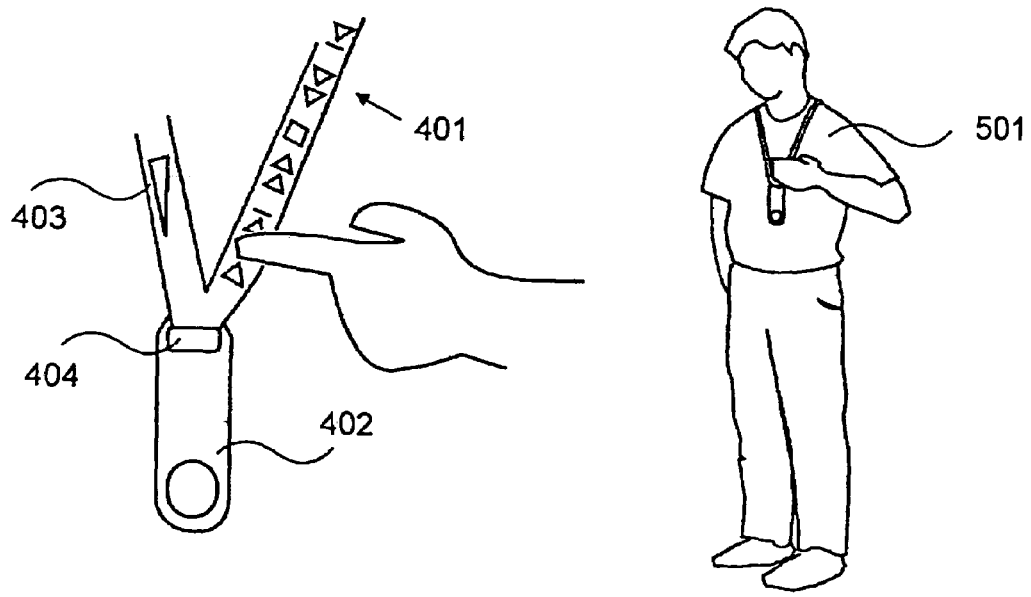
Figure 4
Figure 5

LINEAR PRESSURE SENSOR

BACKGROUND OF THE INVENTION

1. Field of the Invention

The present invention relates to sensors, in particular pressure sensors.

2. Description of the Related Art

Pressure sensors have many-practical applications and may be used to detect that a person is sitting in a car seat or to detect an obstacle in the path of a mechanical moving part. For example, a motorised garage or lift door may be equipped with a pressure sensor on the leading edge. When an obstacle is detected, an input signal may be provided to the motor control from the sensor, which in turn may trigger the motor control to reverse the direction of motion of the moving door to prevent damage to the door and/or the obstacle. Applications may be safety-critical.

Different types of pressure sensor are suitable for such an application. These include pneumatic based sensors that utilise a tube and an air pressure sensor arranged to detect a change in the internal tube pressure. Wire based sensors utilise conductive strips located within a soft component and are arranged to detect contact between the strips. Optical based sensors utilise a hollow, flexible soft component, light transmission and a receiver arranged to detect light occlusion. Field based sensors utilise an antenna to establish an electrical field along the leading edge, arranged to detect the presence of a conductive object. Another type of sensor utilises a flexible surface incorporating push-button control switches, formed from layered conductive plastic or foil. A common problem with these types of sensors is that they display unsatisfactory durability. Applications for the above types of sensor are restricted by the limited ability of pneumatic, wire, optical and push-button switch based sensors to accommodate bends or curves around tight radii, and the difficulty of operating a field based sensor in a changing environment.

BRIEF SUMMARY OF THE INVENTION

According to a first aspect of the present invention there is provided a linear sensor comprising electrically conductive textile fibres and electrically insulating textile fibres, wherein said sensor further comprises at least two conductive elements formed from said electrically conductive fibres, and said insulating textile fibres are spaced apart to allow electrical conduction between two conductive elements under the application of pressure.

In one embodiment, the sensor comprises a first conductive element, a second conductive element and a third conductive element, said first conductive element disposed between and electrically insulated from said second and third conductive elements, said sensor configured to allow electrical connection between said first conductive element and one of said second and third conductive elements.

In a preferred embodiment the sensor said at least two conductive elements comprise a first conductive element having electrically conductive textile fibres extending along at least a portion of the length of said sensor, and a second conductive element having electrically conductive textile fibres extending along at least said portion of the length of said sensor, and said sensor further comprises a third conductive element extending along at least said portion of the length of said sensor, wherein said third conductive element is electrically insulated from said first and second conductive elements over said portion of the length of said sensor, and said third conductive element is electrically connected at one end to only one of said first conductive element and said second conductive element.

According to a second aspect of the present invention there is provided a linear sensor comprising electrically conductive textile fibres and electrically insulating textile fibres: said sensor comprising a first conductive element having electrically conductive textile fibres extending along the length of said sensor; a second conductive element having electrically conductive textile fibres extending along the length of said sensor and surrounding said first conductive element; and electrically insulating textile fibres configured to (i) separate said two electrically conductive elements when no pressure is applied to said sensor and (ii) allow electrical conduction between said two conductive elements under the application of pressure.

BRIEF DESCRIPTION OF THE SEVERAL VIEWS OF THE DRAWINGS

FIG. 3 shows an electrical arrangement for linear sensor 201 of FIG. 2; and

FIGS. 4 and 5 illustrate an application of a linear sensor.

BEST MODE FOR CARRYING OUT THE INVENTION

FIG. 1

The present invention provides a linear sensor having a construction utilising textile fibre. The sensor is suitable for use in linear position sensing applications.

Many textile structures may be used to produce a strip or braid on which to base the sensor. Such textile structures may be; produced substantially in one operation, using conventional textile manufacturing techniques, such as weaving, knitting or braiding. The incorporation of elastic fibres, such as Lycra™ or Elastane™ into the textile structure assists the structure to return substantially to its original shape after the application of pressure.

Figure 1:
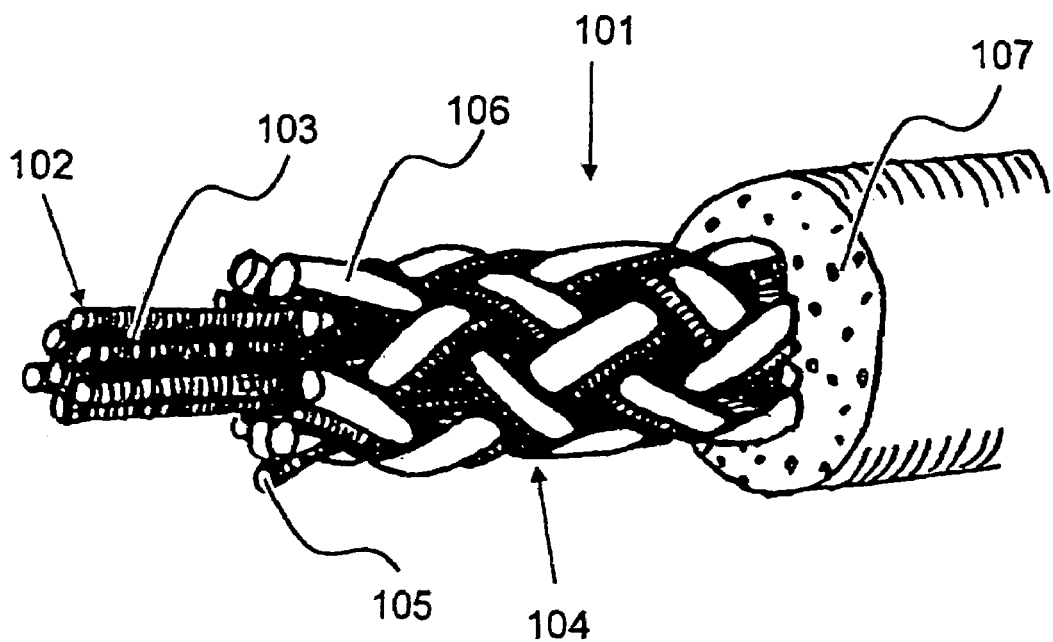
FIG. 1 shows an end of a sensor 101 having a construction utilising textile fibre.

FIG. 1 illustrates a construction of textile structure 101. The structure 101 comprises a first conductive element 102, which extends substantially centrally along and through the length of the structure 101. In this example, conductive element 102 is fabricated from a bundle of carbon impregnated nylon conductive textile fibres 103, such as F901, available from Shakespeare Inc. A second conductive element, 104 is braided around the central conductive element 102. The second conductive element comprises similar carbon impregnated nylon conductive textile fibres 105 and insulating fibres 106. The diameter of the insulating fibres 106 is greater than the diameter of the conductive fibres 105, such that, in the no pressure applied condition, the second conductive element 104 does not make electrical contact with the central conductive element 102. However, within the structure of the braided conductive element 104 the fibres are sufficiently spaced to allow electrical contact between the second conductive element 104 and the central conductive element 102 when pressure is applied to the textile structure 101. Using conductive fibres and insulating fibres having different diameters is only one way to achieve this functionality.

The structure 101 further comprises a flexible, insulating, soft foam sheath 107 or sleeve surrounding the second conductive element 104. The sheath 107 serves to provide protection for the structure 101 and facilitates the application of pressure to individual conductive fibres within second conductive element 104. However, sheath 107 is arranged to be stripped away from the structure 101, to allow electrical connection to be made with a conductive element of the structure 101. According to the present example, first conductive element 102 and second conductive element 104 are concentric.

Thus, the present invention provides a linear sensor having a first conductive element and a second conductive element normally spaced apart but arranged to make contact under applied pressure. The linear sensor may take a string-life form.

In a preferred embodiment of linear sensor, at least the second conductive element is constructed such that the fibres therein extend in a direction that is not along the same axis of the length of the linear sensor. This feature facilitates local stretching, which in turn facilitates bending and flexing of the sensor without causing unwanted contacts between the inner and outer conductive elements. Local stretching is further facilitated by the inclusion of elastic fibres, for example Lycra™ fibres, which help to return the structure to its original shape following the application of pressure thereto.

FIG. 2

Figure 2:
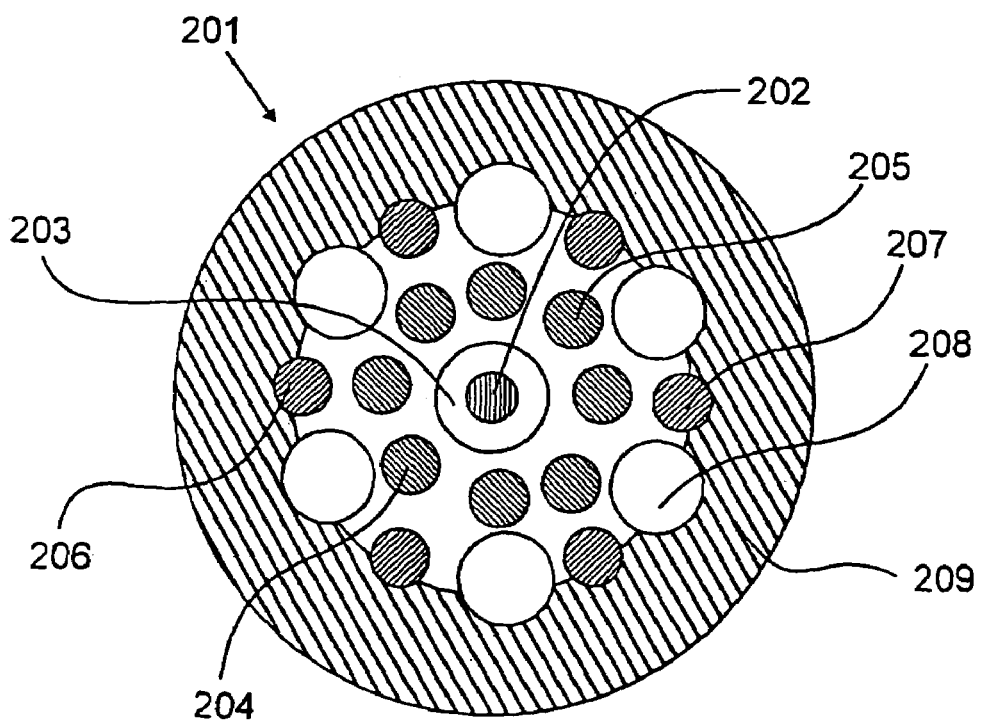
FIG. 2 shows a cross-section of a second linear sensor 201.

A cross-section of a linear sensor 201 according to the present invention is shown in FIG. 2. The sensor 201 comprises an insulating element 203, in this example polyurethane plastic. A first conductive element 204 comprising conductive fibres 205 surrounds the insulating element 203. A second conductive element 206 comprising conductive fibres 207 and insulating fibres 208 surrounds the first conductive element. The diameter of the insulating fibres 208 of second conductive element 206 is greater than that of the conductive fibres thereof. The sensor 201 also comprises a third, central conductive element 202 located within the insulating element 203 such that it is surrounded by said insulating element and thereby insulated from the first conductive element 204. A sheath 209 surrounds the second conductive element 206. Thus, the base structure of linear sensor 201 is similar to the textile structure 101 shown in FIG. 1, but with the addition of the further inner conductive element 202.

In the present embodiment, the central conductive element 202 comprises conductive textile fibres of a similar type to those contained in the first and second conductive elements, but in an alternative embodiment the central conductive element comprises metallic wires.

Pressure applied to the sheath 209 causes it to deform and push conductive fibres 207 of second conductive element 206 inwards towards conductive fibres 205 of first conductive element 204, until at a threshold pressure electrical contact is established between the conductive fibres 205, 207 of the first and second conductive elements 204, 206. Thus, the insulating fibres generally insulate the first conductive element from the second conductive element unless an applied pressure forces said conductive elements together.

It should be noted that the function of the insulating element 203 differs from that of the insulating fibres 208 in that it continues to insulate the central conductive element 202 from the first conductive element 204 even when pressure is applied.

The central conductive element 202 provides a separate conductor that may be used to establish an electrical contact at each end of one of the first and second conductive elements 204, 206, to allow an electrical potential to be established across the ends of the conductive element.

FIG. 3

An electrical arrangement for linear sensor 201 is illustrated in FIG. 3. By use of central conductive element 202, both +V and 0V electrical connections are made at one end of the linear sensor 201. A first electrical connection is made by connecting +V to the second conductive element 206. A second electrical connection is made by connecting 0V to the third conductive element 202. A third connection is made to second conductive element 204, which allows a voltage measurement reading to be taken.

At the other end to the first, second and third electrical connections, a terminating piece 301 provides an electrical connection between second conductive element 206 and the central conductive element 202. Thus, the central conductive element 202 acts as a link to facilitate the application of an electrical potential across the linear sensor 201.

An electrical potential is applied across one of the first and second conductive elements of linear sensor 201, in this example across second conductive element 206. Under sufficient applied pressure, electrical contact is made between the second and first conductive elements, whereafter the linear sensor 201 acts substantially as a potentiometer. A "wiper" voltage reading may then be taken at the third electrical connection to first conductive element 204. Such a voltage reading provides an indication of the position of the centre of contact between the first and second conductive elements 204, 206 along the length of the linear sensor 201.

If the central conductive element 202 is omitted from the structure of the linear sensor 201, the sensor may act as a switch, with two electrical connections, one each made to first conductive element 204 and second conductive element 206. However, the electrical connection provided by central conductive element 202 provides the described potentiometer function and enables a configuration arranged to provide an indication of the position of a mechanical interaction along the linear sensor. It should be noted that in each embodiment, the sensor is a linear sensor in that it has a length which is substantially longer than its other dimensions.

A linear sensor according to the present invention may be connected to a data processing means, for example a PIC micro-controller, such as PIC16F71 incorporating an A to D converter. The data processing means may receive frequent voltage measurements taken from the linear sensor. This data may then be encoded and used to communicate with a separate device, such as a portable MP3 player or pendant mobile phone.

FIGS. 4 and 5

An application of a linear sensor is illustrated in FIGS. 4 and 5. A linear sensor is incorporated into a lanyard 401, or neck-strap, on which a portable MP3 player 402 is worn around the neck of a user 501. The lanyard 401 has characters or symbols 403 printed on the surface, representing controls. By stroking and/or pressing the characters or symbols 403, the user 501 can interact with the linear sensor. Control data, processed from positional data from the sensor is sent to the MP3 player 402 via the micro-controller mounted in interface connector 404. The neck-strap 401 may thus be used to control functions of the MP3 player 402 such as play functions and volume control.

The invention claimed is:

1. Apparatus for controlling the functions of an MP3 player, comprising:
    a substantially linear strap having electrically conductive textile fibers and electrically insulating textile fibers such that electrical conduction occurs when pressure is applied to said strap:
    symbols placed on said strap to represent controls for an MP3 player; and
    an interface that includes a controller for interfacing the strap to the MP3 player, such that a user can interact with the strap in order to control the MP3 player by stroking, pressing, or stroking and pressing said symbols, and
    wherein two electrical connections (+v and 0v for example) are made at one end of the strap and a third connection is made to an additional conductive element to allow a voltage measurement to be taken.

2. Apparatus of claim 1 wherein said strap is a neck strap or lanyard.

3. Apparatus according to claim 1, wherein the controller is a micro-controller that incorporates an A to D converter.

4. A method of controlling functions of an MP3 player, comprising the steps of:
    applying pressure to a strap by pressing and/or stoking symbols placed on said strap that represent controls for said MP3 player; and
    monitoring the output from said MP3 player and modifying the application of said pressure in response to said modification; wherein
    said strap is substantially linear and has electrically conductive textile fibers and electrically insulating fibers; and
    said strap includes an interface for interfacing to an MP3 player, said interface including a controller for applying voltages to and measuring voltages from said strap,
    wherein an electrical potential is applied across one of a first and second conductive elements and a voltage reading is taken from a third electrical connection.

5. A method according to claim 4, wherein the strap is worn in the fashion of a self-supporting lanyard.

6. A method according to claim 4, wherein the strap is worn about the person.

* * * * *